United States Patent
Saupp

[15] 3,658,158
[45] Apr. 25, 1972

[54] ANTI-SKID DEVICE FOR MOTOR VEHICLES

[72] Inventor: Chauncey P. Saupp, 31 Bennett Street, Williamsport, Pa. 17701

[22] Filed: Feb. 17, 1970

[21] Appl. No.: 12,103

[52] U.S. Cl..............................188/4 B, 180/15
[51] Int. Cl. ..............................B60t 1/04
[58] Field of Search......................180/15; 188/4 B

[56] References Cited

UNITED STATES PATENTS 2,886,138   5/1959   Bruner..................188/4 B
3,068,949  12/1962   Sirois...................188/4 B X Primary Examiner—Duane A. Reger
Attorney—Ralph Hammar

[57] ABSTRACT

An anti-skid device for motor vehicles having a hub with radial spokes with the spokes made in two parts with a sliding connection therebetween so that the spokes may change in length as they pass under the tire.

5 Claims, 7 Drawing Figures

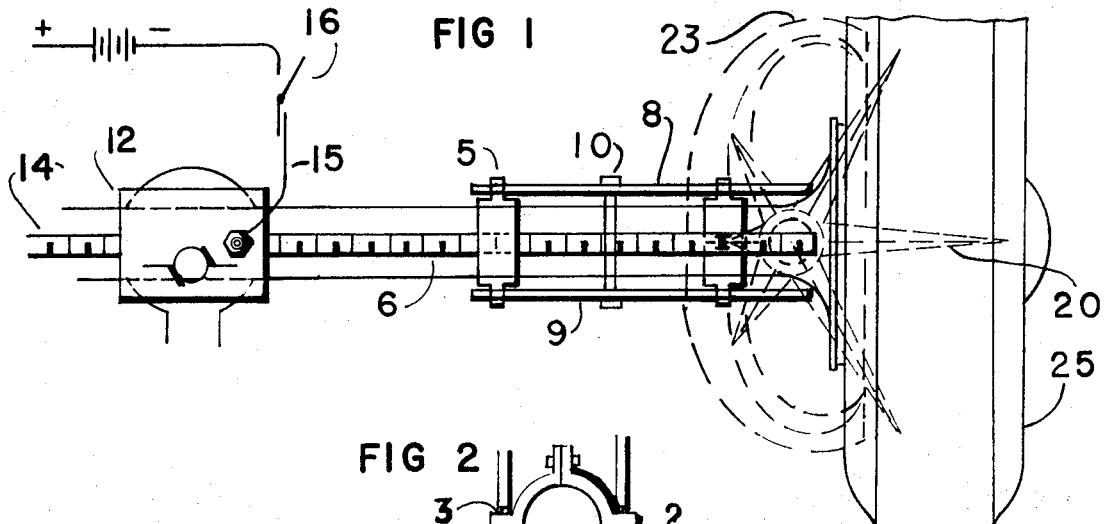
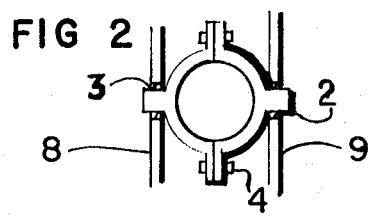
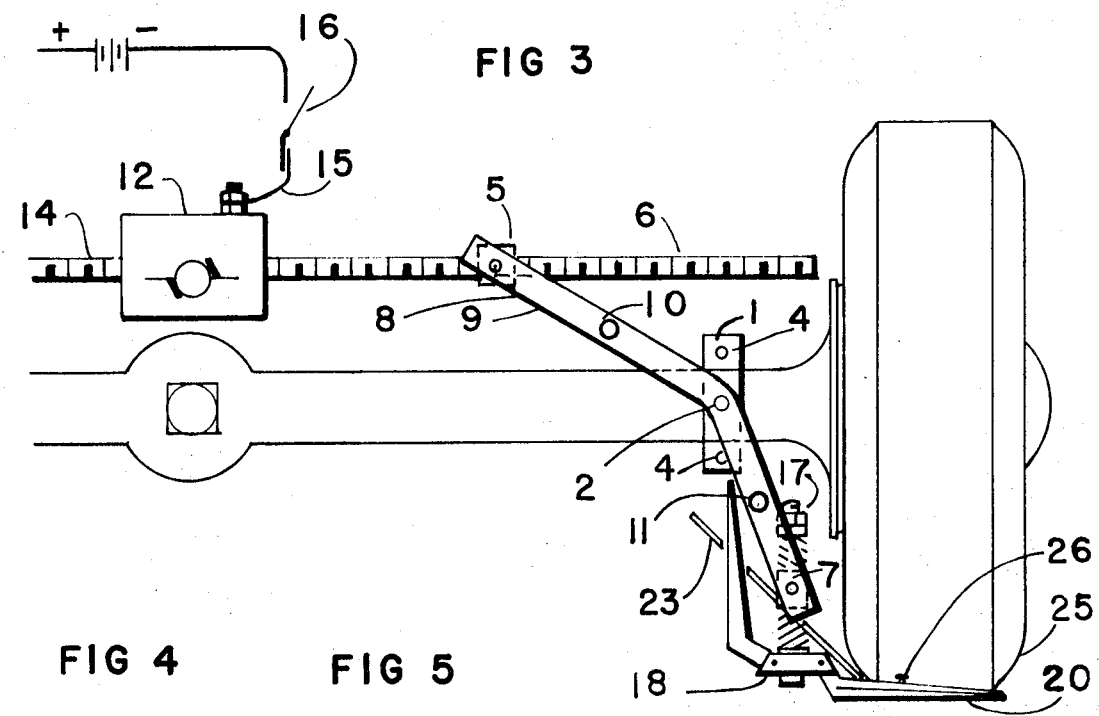
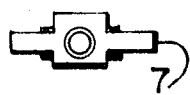
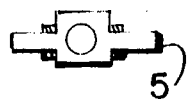
Chauncey P. Saupp
INVENTOR

PATENTED APR 25 1972 3,658,158

INVENTOR.
Chauncey P. Saupp

ANTI-SKID DEVICE FOR MOTOR VEHICLES

This invention relates to the skid retarding of motor vehicles and more particularly to the means for remote control of the skid retarding device for moving vehicles.

One of the objects of this invention is to provide means for housing the device in such a manner that it will be ineffective and obscure when not in operation and be readily adaptable to the conventional vehicle.

Another object of the invention is to provide means for the remote control of the anti-skid device from the drivers compartment of the vehicle in order that it may be made operative in time of danger and inoperative when no longer needed for safety.

With the foregoing and other objects in view, which will appear as the description proceeds, the invention resides in a combination and arrangement of parts and in the details of construction hereinafter described and claimed, it being understood that changes in the precise embodiment of the invention hereindescribed may be made within the scope of what is claimed without departing from the spirit of the invention.

Further objects will appear from the detail description taken in connection with the accompanying drawing in which:

FIG. 1 shows a plan view of the invention in open or operable position.

FIG. 2 is a sectional view of the mounting bracket and spindle assembly.

FIG. 3 is an elevation view showing the invention in relation to the conventional vehicle wheel.

FIG. 4 shows a sectional view of the swivel 7 with spindles.

FIG. 5 shows a sectional view of swivel 5 with spindles and thread block to fit thread bars 6 and 14.

Figure 6:
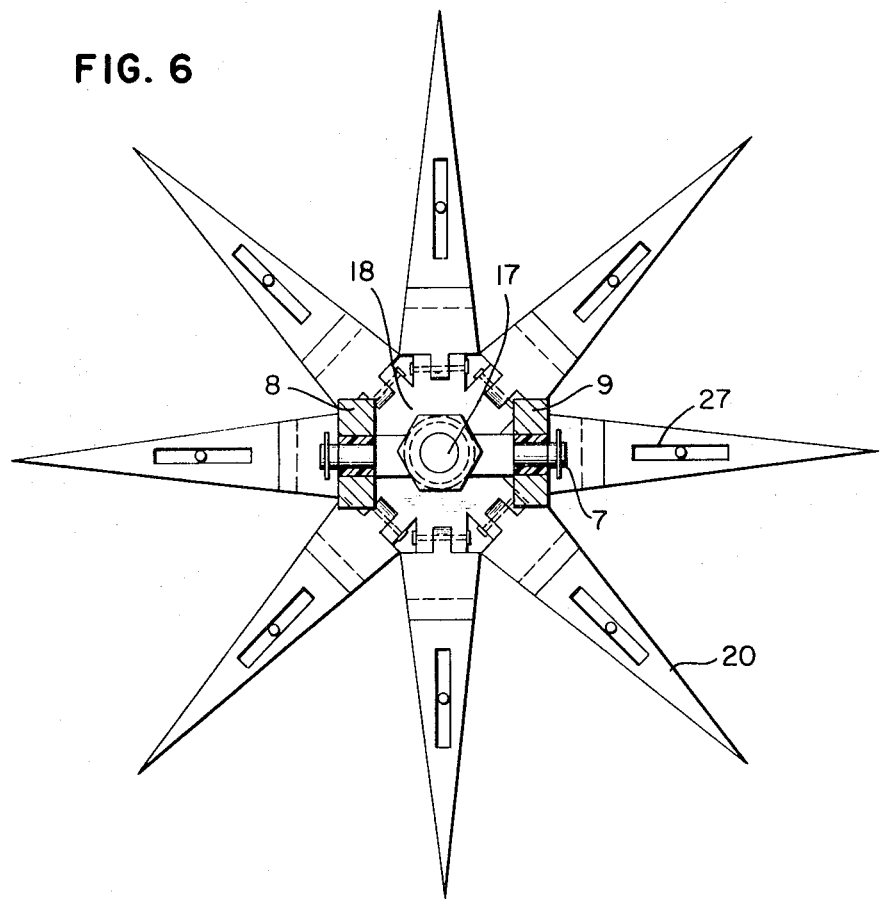

FIG. 6 is an enlarged plan view of the traction assembly and spacer arms.

Figure 7:
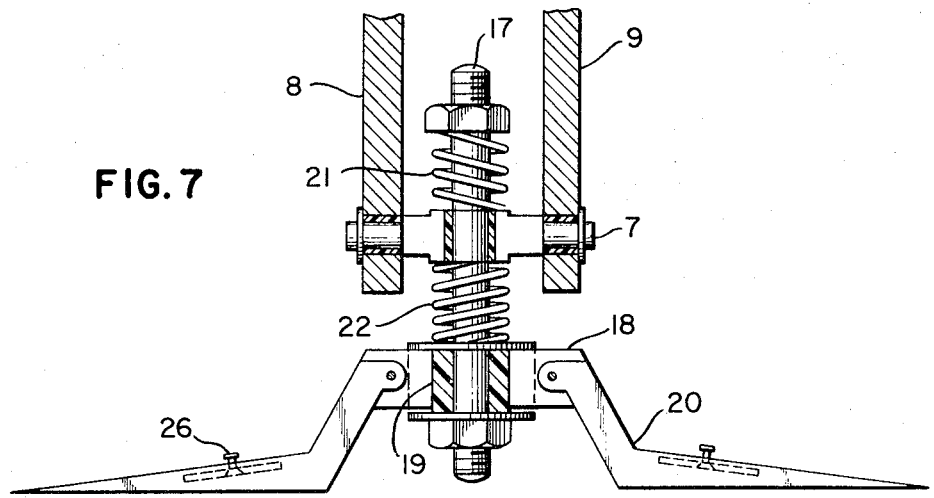

FIG. 7 is an enlarged elevation view of the traction assembly and spacer arms.

Referring to the drawings in detail, this invention embodies a mechanism which is designed to fit at the rear of conventional motor vehicles, having means to mount it securely to a portion of the vehicle. There is provided clamp 1, including spindle 2, bushing 3 and bolts 4, to mount the invention at a desired location on a conventional vehicle.

A threaded block 5, with two spindles and bushings, is attached to threaded bar 6. A swivel block 7, with two spindles and three bushings as shown, is fitted to the traction assembly portion of the invention as shown in FIG. 6. Spacer bars 8 and 9 are positioned on the spindles of clamp 1, threaded block 5 and swivel block 7 and secured by adjustable bolts 10 and 11.

A heavy duty thread bar 6 and bar 14 of opposite thread, are coupled to the shafts of reversible motor 12. The motor is connected by electric conductor to a reversible control switch 16 located in the driver's compartment of the vehicle and thence to the conventional vehicle electrical system.

Traction assembly 18 consists of a shaft 17 with a bearing 19 and movable, hinged spokes 20. Springs 21 and 22 which, together with traction assembly 18 and swivel 7 are fitted on shaft 17, as shown in FIG. 6. A guide plate 23 is attached to shaft 17 using a bearing in order that the plate will not rotate with the shaft, but will guide the rotating, hinged spokes to positions as shown in FIG. 3. 26 is a knob which grips the tire.

In the operation of the device, switch 16 in the driver's compartment activates the motor 12, which rotates threaded bars 6 and 14 and in turn moves spacer arm 10 and positions spokes of traction assembly 18 underneath conventional vehicle tire 25. The tapered spokes of assembly 18 can be positioned underneath the vehicle tire to the desired extent, the thin ends of the tapered spokes for traction on ice and the thicker ends for added traction on snow or mud. Guide plate 23 guides the traction assembly to the under side of the vehicle tire between the tire and roadway surface. This guarantees remote control of the desired traction.

When switch 16 in the driver's compartment is reversed, the motor 12 reverses the threaded bars 6 and 14 and the traction device is folded back away from the vehicle wheel to a position of inoperation.

From the foregoing description, it can be readily seen that the driver of a motor vehicle will have remote control over the degree of traction required in time of slippery highway conditions. The invention enables a driver to install and remove the anti-skid device with the flip of a switch, whether the vehicle is moving or stopped.

The aforementioned information is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and fully described the invention, what is now claimed as new is as follows:

1. An anti-skid device for motor vehicles comprising in combination traction assembly having a movable hub rotatably mounted on carrier means, said hub having protruding, tapered spokes or flanges, said carrier means being movably mounted to position the tapered spokes of the traction assembly to desirable extents underneath conventional vehicle tires and thereby control traction to a desired degree by permitting the spokes of the traction assembly to rotate under the tire and on the roadway surface as the vehicle wheel turns, said spokes of the traction assembly have a movable knob which will change radii, a longitudinal slot in the spoke will permit the movable knob to be fit so as to slide in either a greater or lesser radius in order to compensate for the rotation of the traction device in relation to the conventional tire tread.

2. An anti-skid device for motor vehicles as set forth in claim 1, wherein the traction assembly is retractably mounted on a shaft by a coil spring secured with retaining nuts, positioned to compensate for the resilience and shock of the conventional pneumatic tire on the vehicle.

3. An anti-skid device for motor vehicles as set forth in claim 1, wherein the spokes or fangs of the traction assembly are hinged to the hub and fit into a slot of a beveled guide plate to guide and fold the spokes as the traction assembly rotates.

4. An anti-skid device for motor vehicles as set forth in claim 3, wherein said guide plate on the traction assembly and the spacer arms are connected by a coil spring to guide the traction assembly spokes underneath the vehicle tire as the device is moved to operable position.

5. An anti-skid device for motor vehicles as set forth in claim 4, wherein the carrier means has spacing bars and adjusting bolts are fitted into openings in the spacing bars and mounted transversely to vary the tension between the spacing bars and spindles to compensate for wear and set the desired tension for operation.

* * * * *